United States Patent [19]
Baals et al.

[11] Patent Number: 5,381,463
[45] Date of Patent: Jan. 10, 1995

[54] ARRANGEMENT FOR SECURING MENU SCREENS ON A TELEPHONE TERMINAL

[75] Inventors: Kimberly A. Baals, Matawan; Edward W. Boakes, Middletown; Kathleen J. Chylinski, Bridgewater; Darren A. Kall, Highland Park; Gary C. Smith, Freehold; Susan L. Tuttle, East Windsor, all of N.J.

[73] Assignee: AT&T Corp., Murray Hill, N.J.

[21] Appl. No.: 47,585

[22] Filed: Apr. 13, 1993

[51] Int. Cl.⁶ .......................... H04M 11/00
[52] U.S. Cl. .......................... 379/96; 379/95
[58] Field of Search .................. 379/96, 354, 355, 356, 379/359, 94, 97, 98, 95; 340/825.31, 825.34

[56] References Cited

U.S. PATENT DOCUMENTS

| | | | |
|---|---|---|---|
| 4,291,198 | 9/1981 | Anderson et al. | 379/96 |
| 4,425,627 | 1/1984 | Eibner | 379/96 |
| 4,794,639 | 12/1988 | Urui et al. | 379/94 |
| 4,888,652 | 12/1989 | Sander | 340/825.34 |

*Primary Examiner*—Curtis Kuntz
*Assistant Examiner*—Jason Chan
*Attorney, Agent, or Firm*—Samuel R. Williamson

[57] ABSTRACT

A locking arrangement is provided for limiting access to certain selected menu functions on a telephone terminal is provided. Although these functions are generally located in different sections of the menu hierarchy, each may be unlocked and relocked while a user remains in the same section of the menu hierarchy containing the selected function. For accessing the function, the user enter a password while located in the same section of the menu hierarchy as the function to be accessed. Once the password is entered, direct access to the selected menu function is permitted. The locking arrangement provides for the relocking of each of the selected functions automatically by the user simply exiting the accessed selected function.

11 Claims, 2 Drawing Sheets

ARRANGEMENT FOR SECURING MENU SCREENS ON A TELEPHONE TERMINAL

BACKGROUND OF THE INVENTION

1. Technical Field

This invention is directed to telephone terminals and more particularly, to a telephone terminal having menu screens that are secured at the terminal through a locking arrangement.

2. Description of the Prior Art

Current trends in the design of telephone terminals indicate that more and more telephone functionality is being integrated into the telephone display. For example, information as to the features available on the display has migrated from LEDs to the display, and local additions such as directories, status inspection, incoming caller information etc., are all migrating to the display.

The technology presently in use in telephone displays is character-based liquid crystal device (LCD) displays. These displays are configured in various array sizes such as, for example, 2 line by 24 character LCD and 2 line by 40 character LCD. In order to be aesthetically pleasing when incorporated into the telephone housing, these displays tend to be small, typically on the order of one inch in height. Also, in order to provide a reasonable number of characters for information such as caller information and directory access information, a small font size for the characters is generally used.

Many interactive display arrangements available today permit accessing the features available on the display through softkeys. In order to provide a high level of functionally with a sufficient level of clarity in these displays, many softkey label screen prompts have heretofore been provided for accessing the available features. Although these screen prompts are provided to improve clarity and ease of use of the display as a user of the telephone terminal moves about in the hierarchy of menu screens, often they tend to be confusing as well.

An available feature currently being provided in display arrangements is one which allows the user to lock a particular softkey function on the telephone terminal. Before permitting a user to access a locked softkey function, however, display arrangements in the prior art require the user to navigate in the hierarchy of menu screens to a section of the menu where this function may be unlocked. This section of the menu is different from the section of the menu in which the locked function is accessed.

Similarly, after unlocking the function, the user must then move to the section in the menu having the function that he or she wishes to access. After accessing the function, should the user desire to relock it, he or she must return to that section in the menu where this function may again be locked. It is desirable, therefore, that an interactive display arrangement arranged for limiting access to certain softkey functions on the telephone terminal allows a legitimate user to be able to easily gain access to these functions without undue confusion.

SUMMARY OF THE INVENTION

The prior art problem is solved in accordance with the present invention by allowing a user to easily unlock and relock any function he or she wishes to access while remaining in the same section of the menu hierarchy where the function is located.

In accordance with one aspect of the invention, a locking arrangement is provided for limiting access to certain selected functions which are located in different sections of the menu hierarchy. Access to these functions is permitted by simply having a user enter a password while located in the same section of the menu hierarchy as the function to be accessed. Entering the password appears simply as a part of a direct sequence in a process executed in accessing each of the selected functions to which limited access is provided. Once the password is correctly entered, direct access to a desired selected function is provided. Thus the user does not have to determine where he or she has to go in the menu hierarchy in order to unlock a function.

In accordance with another aspect of the invention, the locking arrangement provides for relocking each of the selected functions automatically by the user simply exiting the accessed selected function. The function then remains in the locked condition until again accessed by the user via the password.

BRIEF DESCRIPTION OF THE DRAWING

This invention and its mode of operation will be more clearly understood from the following detailed description when read with the appended drawing in which.

DETAILED DESCRIPTION

Figure 1:
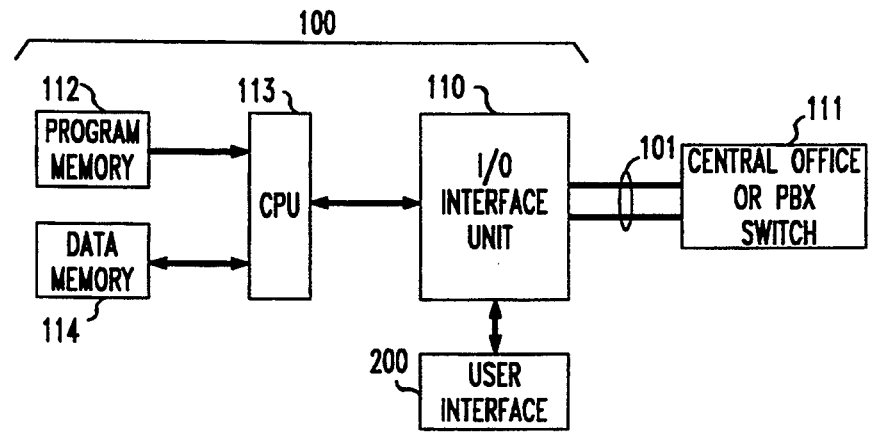
FIG. 1 is a block diagram of a telephone terminal usable for incorporating the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS® central office (CO) switch or the DEFINITY® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the program memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
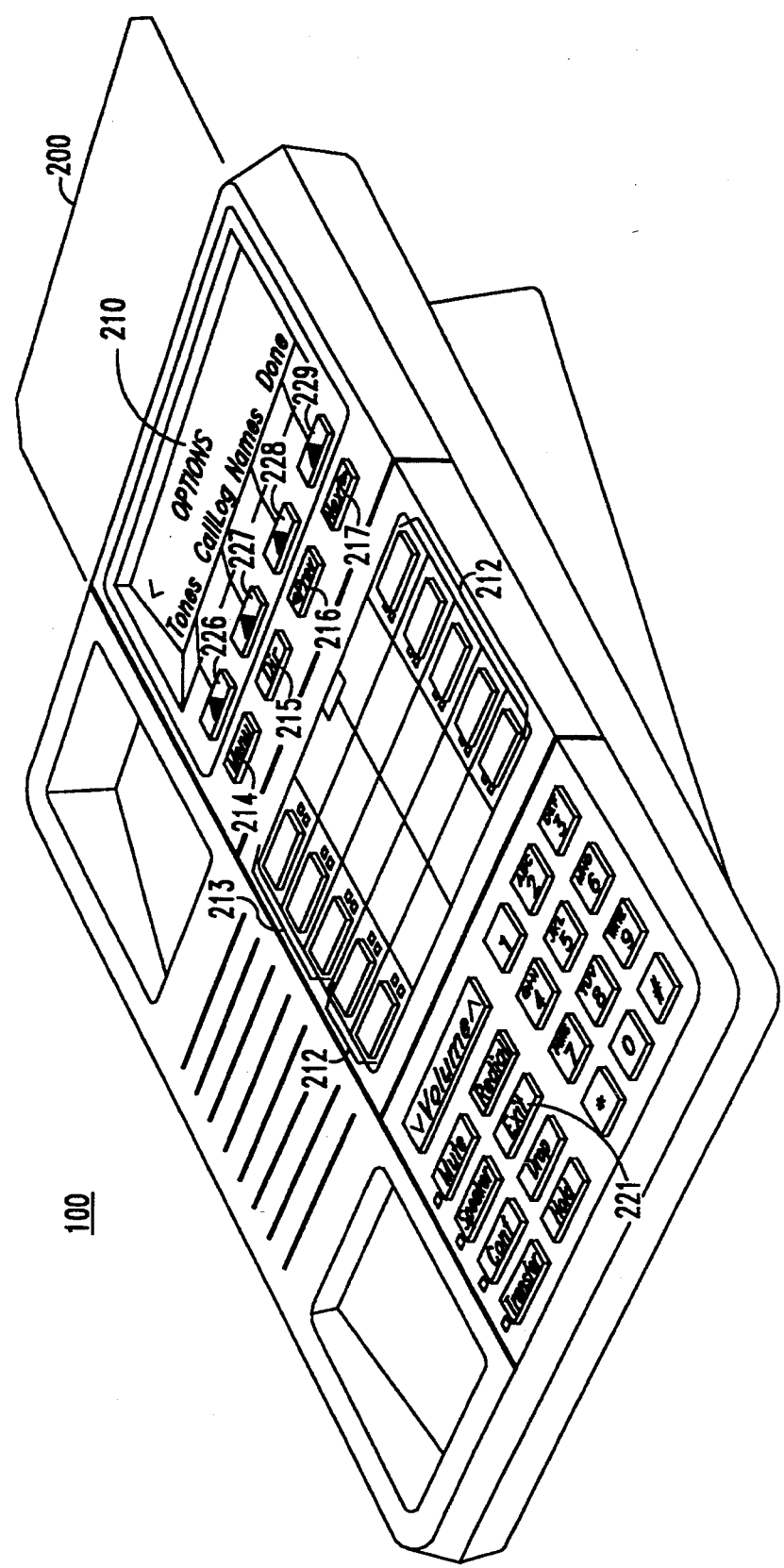
FIG. 2 illustrates the telephone terminal of FIG. 1 including a user interactive display displaying a first menu screen, accessible in accordance with the present invention.

With general reference now to FIG. 2, the user interface 200 comprises a user interactive display 210, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 217 are respectively labeled "Menu", "Dir", "<Prev", and "Next>". The Menu button 214 is used to configure the terminal to the local softkey state, one aspect of which is illustrated later herein with reference also to FIGS. 3 and 4. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229. Also the <Prev and Next> buttons 216 and 217 may be used in the switch feature state, for example, to display the previous or next entry in a directory query feature.

The labels and functions of the softkeys 226 through 229 appear on the associated display 210. The label or function for each of these keys changes dynamically as the user performs functions and makes selections via these softkeys. Shown in the display 210 is just one menu screen in the hierarchically arranged menu. The illustrated entry is that of an OPTIONS screen which the user may enter and perform suitable operations at the indicated functions of Tone, CallLog, Names and Done. These options may be entered by pressing the associated softkey button from among the group of buttons 226 through 228. If no transactions are desired at this screen, the user may move on to another menu screen by pressing the Done softkey button 229 or the <Prev button 216.

While the embodiment of the present invention is described as being incorporated into a telephone terminal, it should be recognized that the present command-operated terminal could be utilized in other program-controlled systems. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2 together with the menu screens 210, 210' and 210" of FIGS. 2, 3 and 4, respectively, which taken together describe the logical steps and the various parameters required to implement the present invention.

The initial locking of the directory is performed in a conventional manner under the control of a process or program executed by the telephone terminal 100. When a user at the telephone terminal selects an option screen (not shown) to lock the CallLog, for example, and a password for the CallLog does not exist, the user is asked to create a password. This password is created in a well known manner by the user entering, for example, up to three digits which are accepted by the telephone terminal after the user provides an indication that he or she is through entering the digits by the password. This indication is provided by pressing the Done softkey 229, which is available on those menu screens requiring such an indication. The user is then asked to reenter the password for verification. After the password has been reentered and the user indicates that he or she is done by pressing the Done softkey 229 again, the telephone terminal accepts this entry (assuming the same number is entered again) and the directory locking process is considered complete.

When the design of the telephone terminal display is such that only one function is to be secured or locked, the locking arrangement may be provided in the same section of the menu hierarchy as the function, even as part of its branch as is known in the art. But where there are many functions to be locked, it is inefficient to establish separate locking arrangements in each branch of the menu hierarchy. It is similarly inefficient to include a locking arrangement in each branch of the menu hierarchy and allow the locking of all functions from one branch. In that separate locking arrangements are desirable for a complex interface, such as described herein, the locking arrangement is configured to centralize the locking of functions in one place in the menu hierarchy while advantageously separating this task from the individual tasks of unlocking and relocking of the secured functions.

An authorized user of the telephone terminal is allowed to easily unlock and relock any function he or she wishes to access while remaining in the same section of the menu hierarchy where that function is located. In this regard and with specific reference to the menu screens 210, 210' and 210" of FIGS. 2, 3 and 4, respectively, the following operative description, in accordance with the invention, is provided.

Figure 3:
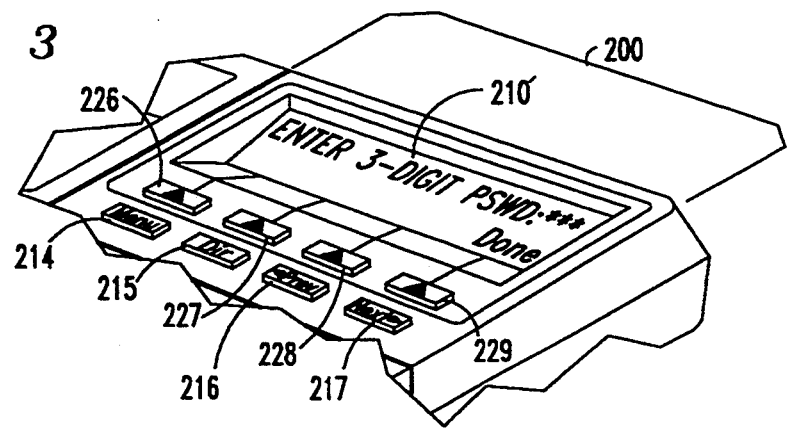
FIG. 3 illustrates the telephone terminal of FIG. 1 including a user interactive display displaying a second menu screen, accessible in accordance with the present invention.
Figure 4:
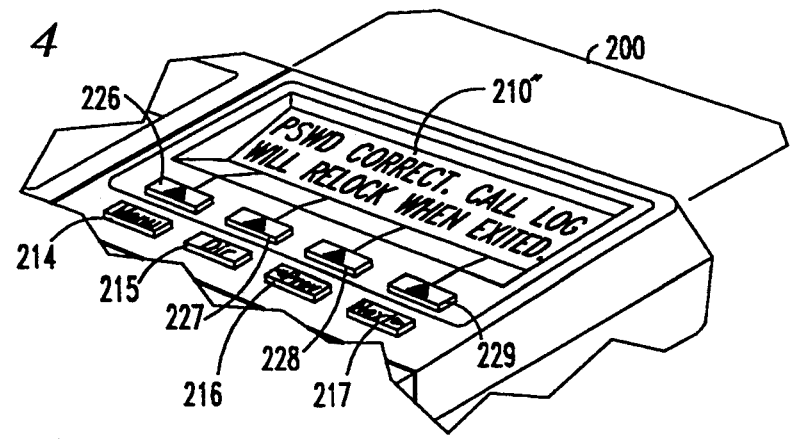
FIG. 4 illustrates the telephone terminal of FIG. 1 including a user interactive display displaying a third menu screen, accessible in accordance with the present invention.

A locking arrangement which operates under the control of the process in the telephone terminal limits access to certain selected functions or features which generally consist of selected sets of information messages. These information messages are located in different sections of the menu hierarchy. Access to these information messages is permitted by simply having a user enter a password while located in the same section of the menu hierarchy as the function to be accessed. By way of example, a user may press the softkey button 227 shown in menu screen 210, of FIG. 2, and select the CallLog function which provides access to sets of information messages. If that function is locked, the menu screen 210', shown in FIG. 3 is presented to the user requiring the user to enter the appropriate password for access. As is apparent from the description herein above, entering the password appears as a part of a direct sequence in the process executed in gaining access to the information messages through the selected function. Once the password is correctly entered, direct access to the information messages available at the selected function is provided.

After the password has been correctly entered, the process executed by the telephone terminal causes the menu screen 210" to be displayed for viewing by the user. This menu screen informs the user that the function will relock automatically when it is exited. The function then remains in the locked condition until again accessed by the user via the password.

What has been described is merely illustrative of the present invention. Other applications to telephone, computer or other user interactive systems other than the disclosed system are contemplated as being within the knowledge of one skilled in the art and may be utilized without departing from the spirit and scope of the present invention.

We claim:

1. An arrangement for displaying menu screens of information messages in a display device at a telephone terminal, the arrangement comprising:

means for generating a plurality of sets of information messages in the telephone terminal, each one of the sets of information messages being accessible within a menu hierarchy for displaying in an associated menu screen;

means for selecting by a user of the telephone terminal selected sets of information messages from the plurality of sets of information messages;

locking means for limiting access to said selected sets of information messages, said selected sets of information messages being located in different sections of the menu hierarchy; and password means generated by the user of the telephone terminal for providing access to each of the selected sets of information messages in the menu hierarchy, the password means being accessible in each section of the menu hierarchy having at least one of said selected sets of information messages, said password means being accessed prior to accessing said selected set of information messages.

2. The arrangement of claim 1 wherein the password means includes means for entering a first password for matching a second password previously provided to the telephone terminal through execution of the locking means.

3. The arrangement of claim 2 further comprising means for accessing the selected set of information messages, responsive to execution of said password means, the accessing means selecting said selected set of information messages.

4. The arrangement of claim 3 wherein the accessing means includes means for actuating one of a plurality of switches on the telephone terminal, each one of said switches being associated with an information message within the selected set of information messages displayed on the menu screen.

5. The arrangement of claim 1 wherein the password means is located in a section of the menu hierarchy different from the sections of said selected sets of information messages.

6. An arrangement for displaying menu screens of information messages in a display device at a telephone terminal, the arrangement comprising:

means for generating a plurality of sets of information messages in the telephone terminal, each one of the sets of information messages being accessible within a menu hierarchy for displaying in an associated menu screen;

means for selecting by a user of the telephone terminal selected sets of information messages from the plurality of sets of information messages;

password means for providing access to each of said selected sets of information messages, said selected sets of information messages being located in different sections of the menu hierarchy and maintained in a locked condition prior to being unlocked by said password means; and locking means for limiting access to the selected sets of information messages, the locking means automatically returning each of said selected sets of information messages to the locked condition whenever either of said selected sets of information messages is accessed and exited.

7. A method for displaying menu screens of information messages in a display device at a telephone terminal, the method comprising the steps of:

generating a plurality of sets of information messages in the telephone terminal, each one of the sets of information messages being accessible within a menu hierarchy for displaying in an associated menu screen;

selecting by a user of the telephone terminal selected sets of information messages from the plurality of sets of information messages;

limiting access to the selected sets of information messages for preventing display of said selected sets of information messages in the display device, said selected sets of information messages being located in different sections of the menu hierarchy, and said access limiting step being implemented by requiring entry of a password; and providing access to each one of the selected sets of information messages directly in a section of the menu hierarchy in which said selected set of information messages is located, the access providing step being provided through entry of the password while the display device is positioned in the section of the menu hierarchy having said selected set of information messages.

8. The method of claim 7 wherein the access providing step further includes the step of selecting an information message from within the selected set of information messages being displayed on the menu screen.

9. The method of claim 8 wherein the access providing step further includes the step of actuating one of a plurality of switches on the telephone terminal, each one of said switches being associated with one of the information messages within the selected set of information messages.

10. The method of claim 7 wherein the access providing step is located in a section of the menu hierarchy different from the sections of said selected sets of information messages.

11. A method for displaying menu screens of information messages in a display device at a telephone terminal, the method comprising the steps of:

generating a plurality of sets of information messages in the telephone terminal, each one of the sets of information messages being accessible within a menu hierarchy for displaying in an associated menu screen;

selecting by a user of the telephone terminal selected sets of information messages from the plurality of sets of information messages;

providing a password for gaining access to each of said selected sets of information messages, said selected sets of information messages being located in different sections of the menu hierarchy and maintained in a locked condition prior to being unlocked by said password providing step; and locking the selected sets of information messages for limiting access to said messages, the locking step automatically returning each of said selected sets of information messages to the locked condition whenever either of said selected sets of information messages is accessed and exited.

* * * * *